(12) United States Patent
Satomi

(10) Patent No.: US 10,255,211 B2
(45) Date of Patent: Apr. 9, 2019

(54) ELECTRONIC CONTROL UNIT

(71) Applicant: Mitsubishi Electric Corporation, Tokyo (JP)

(72) Inventor: Seiichi Satomi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/787,339

(22) Filed: Oct. 18, 2017

(65) Prior Publication Data

US 2018/0307641 A1    Oct. 25, 2018

(30) Foreign Application Priority Data

Apr. 21, 2017    (JP) .................................. 2017-084277

(51) Int. Cl.
*G06F 13/362* (2006.01)
*G06F 13/16* (2006.01)

(52) U.S. Cl.
CPC ........ *G06F 13/362* (2013.01); *G06F 13/1668* (2013.01)

(58) Field of Classification Search
CPC .......................... G06F 13/362; G06F 13/1668
See application file for complete search history.

(56) References Cited

FOREIGN PATENT DOCUMENTS

JP    8-044644 A    2/1996
JP    2993270 B2    12/1999

*Primary Examiner* — Tim T Vo
*Assistant Examiner* — Harry Z Wang
(74) *Attorney, Agent, or Firm* — Sughrue Mion, PLLC; Richard C. Turner

(57) ABSTRACT

Provided is an electronic control unit including: a master microcomputer having a master memory (23) that includes a master target data area (A7), a plurality of transmission master banks (A2, A3), a transmission master information area (A1), a reception slave information area (A4) and a plurality of reception slave banks (A5, A6); and a slave microcomputer having a slave memory (33) that includes a slave target data area (B7), a plurality of transmission slave banks (B5, B6), a transmission slave information area (B4), a reception master information area (B1) and a plurality of reception master banks (B2, B3).

7 Claims, 8 Drawing Sheets

ELECTRONIC CONTROL UNIT

BACKGROUND OF THE INVENTION

1. Field of the Invention

The present invention relates to an electronic control unit that is provided with a plurality of transmitter-receivers connected so as to be capable of communicating with each other.

2. Description of the Related Art

Conventionally, there have been proposed electronic control units (also referred to as ECUs) for distributing a process load and coping with limitations in available functions. Such electronic control units are provided with a main data transmitter-receiver (hereafter referred to as master) and a subordinate data transmitter-receiver (hereafter referred to as slave), such that data communication is performed between the master and the slave (see for instance Japanese Patent No. 2993270 and Japanese Patent Application Publication No. H08-44644).

SUMMARY OF THE INVENTION

In the conventional technology disclosed in Japanese Patent No. 2993270, a problem arises in that if the slave receives a transmission/reception request from the master during updating of a data group to be transmitted by the slave to the master or while the slave is using a data group received from the master, a non-consistent data group is used in which new data after updating and old data before updating are mixed with each other. The conventional technology disclosed in Japanese Patent Application Publication No. H08-44644 requires the use of a reception completion interrupt. Accordingly, the technology cannot be used in data communication that lacks a reception completion interrupt.

An object of the present invention, arrived at in order to solve the above problem, is to achieve an electronic control unit that enables a slave to use new data, without mixing of old and new data, even when the slave receives a transmission/reception request from a master.

The electronic control unit of the present invention includes a main data transmitter-receiver having a master memory, and a subordinate data transmitter-receiver having a slave memory, the main data transmitter-receiver and the subordinate data transmitter-receiver being connected so as to be capable of communicating with each other, wherein the master memory has a master target data area that stores target data, a plurality of transmission master banks that store, as master data, the target data in the master target data area, a transmission master information area that stores master information including updating-target master bank information denoting a transmission master bank that is set as an updating-target master bank, from among the plurality of transmission master banks, a reception slave information area that stores slave information received from the subordinate data transmitter-receiver, and a plurality of reception slave banks that store slave data received from the subordinate data transmitter-receiver, in accordance with the slave information in the reception slave information area; the slave memory has a slave target data area that stores the target data, a plurality of transmission slave banks that store, as the slave data, the target data in the slave target data area, a transmission slave information area that stores the slave information including updating-target slave bank information denoting a transmission slave bank that is set as an updating-target slave bank, from among the plurality of transmission slave banks, a reception master information area that stores the master information received from the main data transmitter-receiver, and a plurality of reception master banks that store the master data received from the main data transmitter-receiver, in accordance with the master information in the reception master information area; as a master data transmission process, the main data transmitter-receiver updates, to new master data to be transmitted, existing master data in the updating-target master bank that has been set, transmits the master information in the transmission master information area, and thereafter transmits the master data in the updating-target master bank; as a master data reflection process, the subordinate data transmitter-receiver sets, as a reflection-target master bank, one of the reception master banks that is different from that of the updating-target master bank information in the reception master information area, and updates existing target data in the slave target data area to the master data in the reflection-target master bank that has been set; as a slave data preparation process, the subordinate data transmitter-receiver updates, to new slave data to be transmitted, existing slave data in the updating-target slave bank that has been set; and as a slave data reception process, the main data transmitter-receiver receives the slave information in the transmission slave information area, sets, as a reception-target slave bank, one of the transmission slave banks that is different from that of the updating-target slave bank information in the reception slave information area, and receives the slave data in the reception-target slave bank that has been set.

The present invention affords an electronic control unit that enables a slave to use new data, without mixing of old and new data, even when the slave receives a transmission/reception request from a master.

DESCRIPTION OF THE PREFERRED EMBODIMENT

A preferred embodiment of the electronic control unit of the present invention will be explained next with reference to accompanying drawings. In the explanation of the figures, identical or corresponding portions will be denoted by the identical reference symbols, and a recurrent explanation thereof will be omitted.

Embodiment 1

Explanation of the Configuration of an Electronic Control Unit 1

Figure 1:
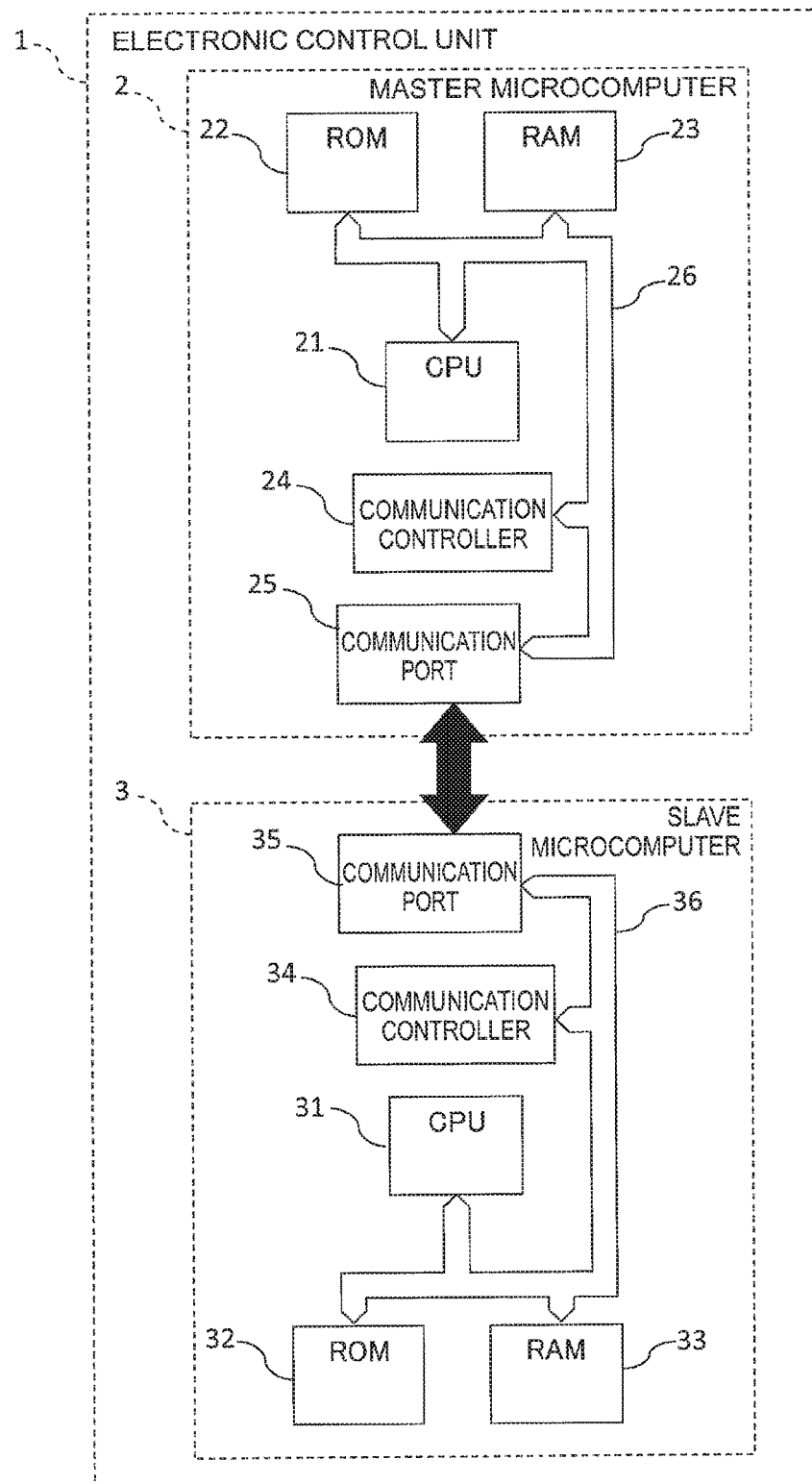
FIG. 1 is a block diagram illustrating the schematic configuration of an electronic control unit of Embodiment 1 of the present invention.

FIG. 1 is a block diagram illustrating the schematic configuration of an electronic control unit 1 of Embodiment 1 of the present invention. In FIG. 1, an electronic control unit 1 is provided with a master microcomputer 2 and a slave microcomputer 3 connected so as to be capable of communicating with each other.

The master microcomputer 2 has built therein a CPU 21 that performs arithmetic processing, a ROM 22 corresponding to a non-volatile memory, a RAM 23 corresponding to a memory capable of writing and reading data, a communication controller 24, and a communication port 25.

The various functional blocks built into the master microcomputer 2 are connected to each other by way of a connection bus 26 corresponding to an address bus or data bus. The ROM 22 stores control data such as a control program. The CPU 21 executes the control program stored in the ROM 22.

The slave microcomputer 3 is configured similarly to the master microcomputer 2. Specifically, the slave microcomputer 3 has built therein a CPU 31 that performs arithmetic processing, a ROM 32 corresponding to a non-volatile memory, a RAM 33 corresponding to a memory capable of writing and reading data, a communication controller 34, and a communication port 35.

The various functional blocks built into the slave microcomputer 3 are connected to each other by way of a connection bus 36 corresponding to an address bus or data bus. The ROM 32 stores control data such as a control program. The CPU 31 executes the control program stored in the ROM 32.

Hereafter the RAM 23 built into the master microcomputer 2 will be referred to as master RAM 23, and the RAM 33 built into the slave microcomputer 3 will be referred to as slave RAM 33.

Explanation of the Features of the Master RAM 23 and the Slave RAM 33

Figure 2:
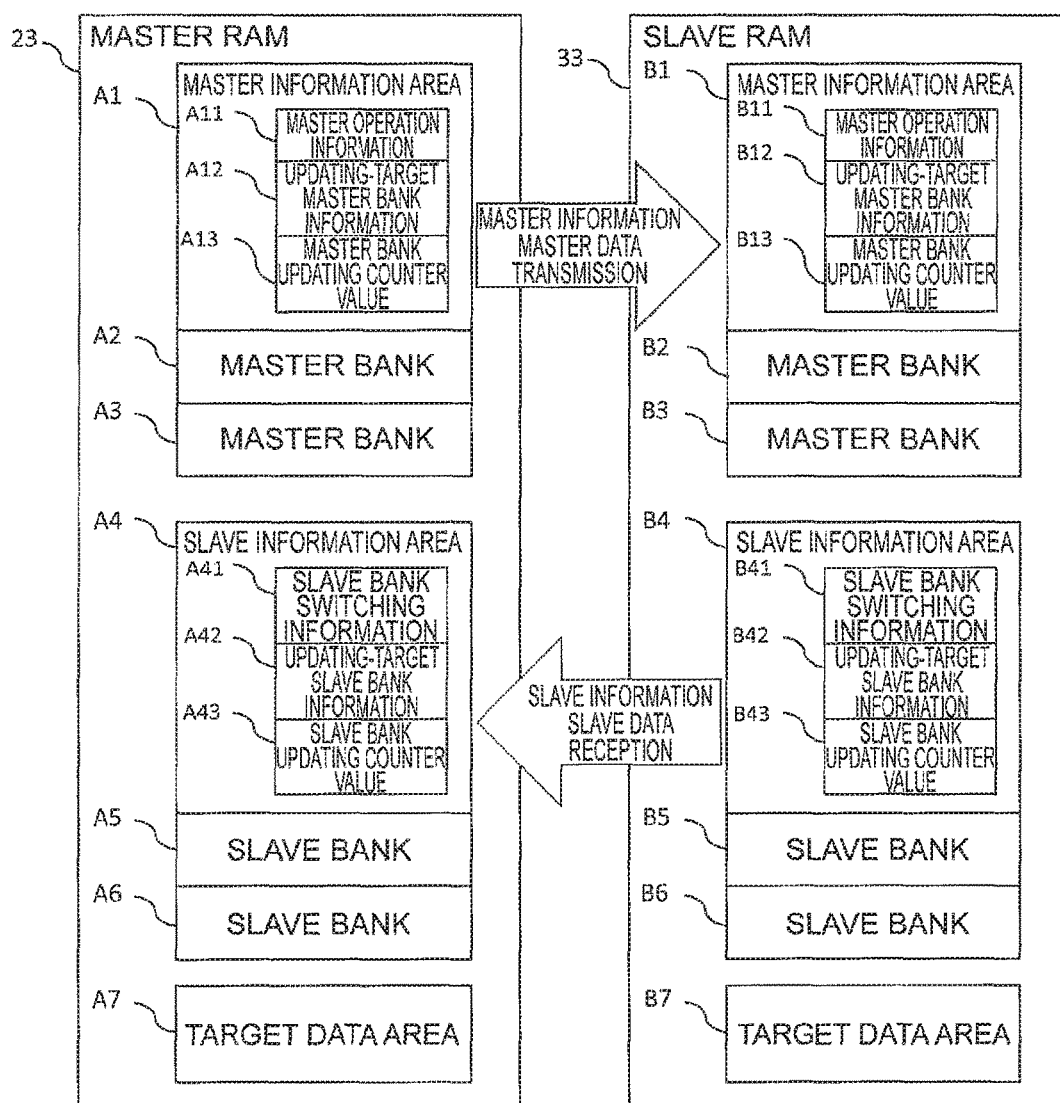
FIG. 2 is a block diagram illustrating the schematic configuration of a master RAM and a slave RAM of Embodiment 1 of the present invention.

The features of the master RAM 23 and the slave RAM 33 will be explained next with reference to FIG. 2. FIG. 2 is a block diagram illustrating the schematic configuration of the master RAM 23 and the slave RAM 33 of Embodiment 1 of the present invention.

The master RAM 23 (master memory) has a master information area A1 (transmission master information area), a master bank A2 (transmission master bank), a master bank A3 (transmission master bank), a slave information area A4 (reception slave information area), a slave bank A5 (reception slave bank), a slave bank A6 (reception slave bank), and a target data area A7 (master target data area).

The slave RAM 33 is configured similarly to the master RAM 23. Specifically, the slave RAM 33 (slave memory) has a master information area B1 (reception master information area), a master bank B2 (reception master bank), a master bank B3 (reception master bank), a slave information area B4 (transmission slave information area), a slave bank B5 (transmission slave bank), a slave bank B6 (transmission slave bank), and a target data area B7 (slave target data area).

Explanation of the Areas of the Master RAM 23

In the master information area A1 there are stored master operation information A11, updating-target master bank information A12, and a master bank updating counter value A13, as master information.

The master operation information A11 is information denoting the operation state of the master microcomputer 2. The updating-target master bank information A12 is information denoting the master bank set as an updating-target master bank, from among the master bank A2 and the master bank A3. The master bank updating counter value A13 is information denoting the number of times that existing master data has been updated in the updating-target master bank.

The target data area A7 stores target data such as control data. In the master bank A2 there is stored, as master data, target data in the target data area A7 that is transmitted to the slave microcomputer 3. In the master bank A3 there is similarly stored, as master data, target data in the target data area A7 that is transmitted to the slave microcomputer 3.

In the slave information area A4 there is stored slave information in the slave information area B4 received from the slave microcomputer 3. Specifically, slave bank switching information B41, updating-target slave bank information B42 and a slave bank updating counter value B43 are stored in a slave information area A4 as slave bank switching information A41, updating-target slave bank information A42 and a slave bank updating counter value A43, respectively.

Slave data received from the slave microcomputer 3 is stored, according to the slave information in the slave information area A4, in the slave bank A5 and the slave bank A6. Specifically, slave data in the slave bank B5 received from the slave microcomputer 3 is stored in the slave bank A5. Slave data in the slave bank B6 received from the slave microcomputer 3 is stored in the slave bank A6.

Explanation of the Areas of the Slave RAM 33

In the master information area B1 there is stored master information in the master information area A1 received from the master microcomputer 2. Specifically, the master operation information A11, the updating-target master bank information A12 and the master bank updating counter value A13 are stored in the master information area B1 as master operation information B11, updating-target master bank information B12 and a master bank updating counter value B13, respectively.

Master data received from the master microcomputer 2 is stored in the master bank B2 and the master bank B3, in accordance with the master information in the master information area B1. Specifically, master data in the master bank A2 received from the master microcomputer 2 is stored in the master bank B2. Master data in the master bank A3 received from the master microcomputer 2 is stored in the master bank B3.

The slave bank switching information B41, the updating-target slave bank information B42 and the slave bank updating counter value B43 are stored, as slave information, in the slave information area B4.

The slave bank switching information B41 is information denoting whether or not to permit a slave bank switching process of switching the setting of an updating-target slave bank. The updating-target slave bank information B42 is information denoting the slave bank set as the updating-target slave bank from among the slave bank B5 and the slave bank B6. The slave bank updating counter value B43 is information denoting the number of times that existing slave data in the updating-target slave bank has been updated.

The target data area B7 stores target data such as control data. Target data in the target data area B7 that is transmitted to the master microcomputer 2 is stored, as slave data, in the slave bank B5. Similarly, target data in the target data area B7 that is transmitted to the master microcomputer 2 is stored, as slave data, in the slave bank B6.

Explanation of First Data Communication between the Master Microcomputer 2 and the Slave Microcomputer 3

Figure 3:
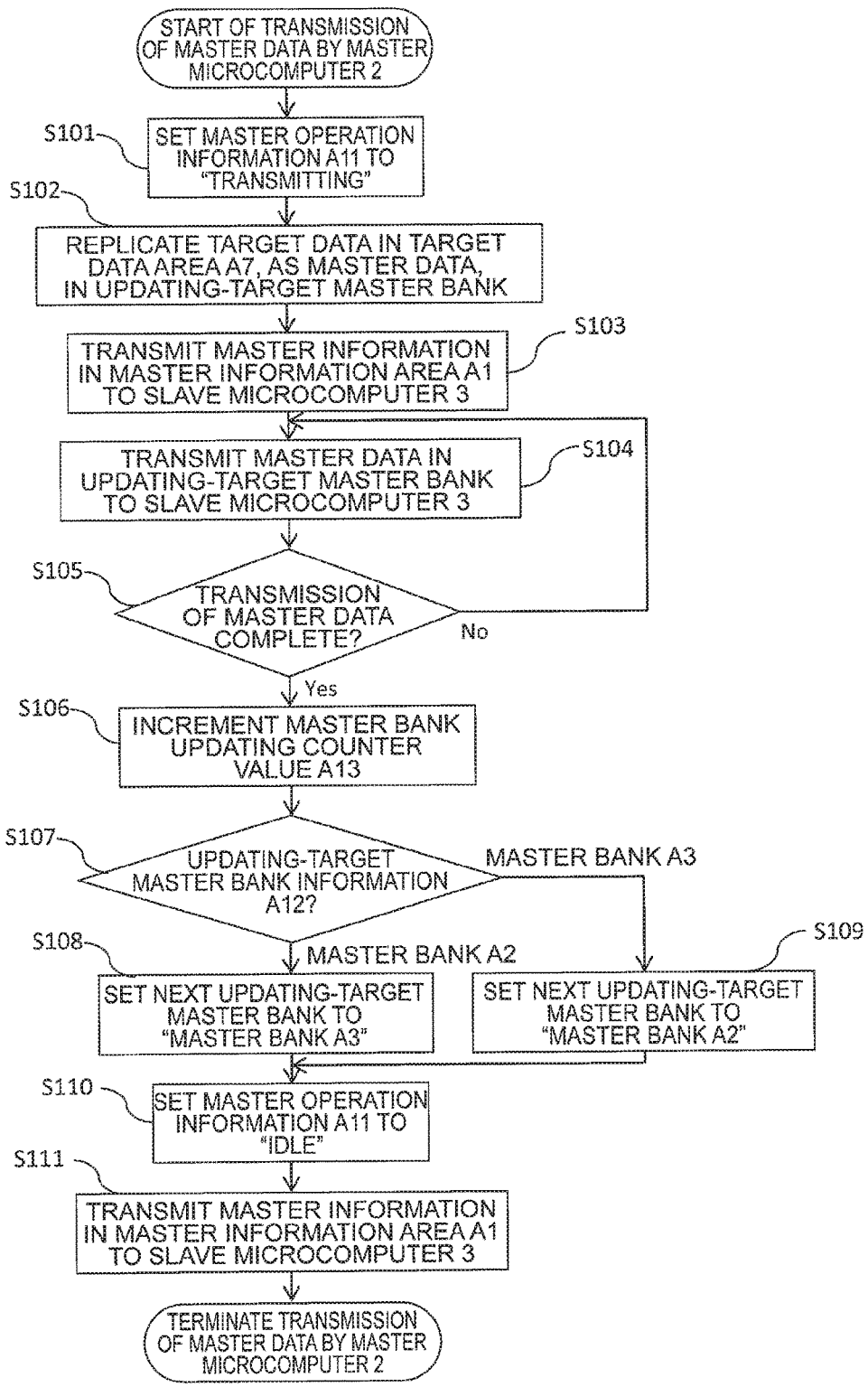
FIG. 3 is a flowchart illustrating a transmission process of master data by a master microcomputer of Embodiment 1 of the present invention.
Figure 4:
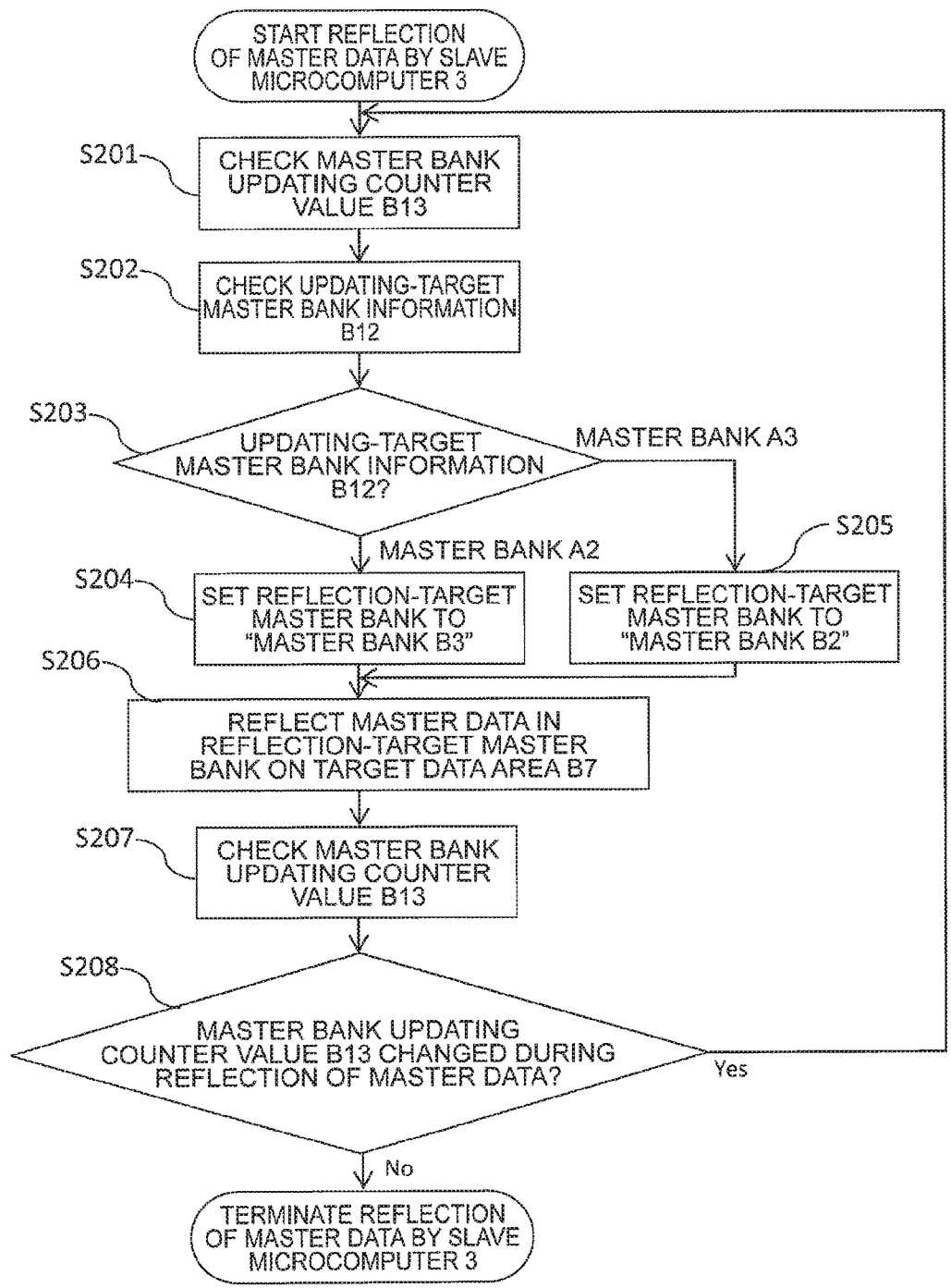
FIG. 4 is a flowchart illustrating a reflection process of master data by a slave microcomputer of Embodiment 1 of the present invention.

An explanation follows next, with reference to FIG. 3 and FIG. 4, on a series of processes for transmission of master data by the master microcomputer 2 and a series of processes for reflection of the master data in the slave RAM 33 by the slave microcomputer 3.

Explanation of a Master Data Transmission Process

The series of processes for transmission of master data by the master microcomputer 2 will be explained first with reference to FIG. 3. FIG. 3 is a flowchart illustrating a transmission process of master data by the master microcomputer 2 of Embodiment 1 of the present invention. The process of the flowchart of FIG. 3 is for instance executed repeatedly according to a pre-set timing.

In step S101, the master microcomputer 2 sets the master operation information A11 to "transmission in progress", and the process proceeds to step S102.

In step S102, the master microcomputer 2 replicates the target data in the target data area A7, as master data, in the currently set updating-target master bank i.e. the master bank denoted by the updating-target master bank information A12, and the process proceeds to step S103. Through replication of the master data in the updating-target master bank, the master microcomputer 2 updates the existing master data in the updating-target master bank to new master data that is transmitted to the slave microcomputer 3.

In step S103, the master microcomputer 2 issues a reception request to the slave microcomputer 3, transmits master information in the master information area A1 to the slave microcomputer 3, and the process proceeds to step S104. In this case, the slave microcomputer 3 receives the master information in the master information area A1, and reflects that master information on the master information area B1.

In step S104, the master microcomputer 2 issues a reception request to the slave microcomputer 3, transmits to the slave microcomputer 3 the master data in the updating-target master bank i.e. the master data resulting from replication in step S102, and the process proceeds to step S105. In this case, the slave microcomputer 3 receives the master data, and reflects the master data on the master bank denoted by the updating-target master bank information B12.

Specifically, if the updating-target master bank information B12 denotes the master bank A2, the slave microcomputer 3 reflects the master data on the master bank B2 corresponding to the master bank A2. If on the other hand the updating-target master bank information B12 denotes the master bank A3, the slave microcomputer 3 reflects the master data on the master bank B3 corresponding to master bank A3.

In step S105 the master microcomputer 2 determines whether transmission of the master data is complete or not. If transmission of master data is complete, the process in the master microcomputer 2 proceeds to step S105, whereas if master data transmission is not complete, the process returns to step S104.

As indicated by step S101 to step S105, the master microcomputer 2 updates the existing master data in the set updating-target master bank to new master data that is transmitted to the slave microcomputer 3. The master microcomputer 2 transmits the master information in the master information area A1 to the slave microcomputer 3, and thereafter transmits the master data in the updating-target master bank to the slave microcomputer 3.

In step S106, the master microcomputer 2 increments the master bank updating counter value A13 by 1, and the process proceeds to step S107.

In step S107, the master microcomputer 2 checks the updating-target master bank information A12. If the check result is that the updating-target master bank information A12 denotes the master bank A2, the process in the master microcomputer 2 proceeds to step S108, whereas if the updating-target master bank information A12 denotes the master bank A3, the process proceeds to step S109.

In step S108 the master microcomputer 2 sets a next updating-target master bank to "master bank A3", and the process proceeds to step S110. In this case, the master microcomputer 2 stores the set master bank A3 in the master information area A1, as the updating-target master bank information A12.

In step S109 the master microcomputer 2 sets a next updating-target master bank to "master bank A2", and the process proceeds to step S110. In this case, the master microcomputer 2 stores the set master bank A2 in the master information area A1, as the updating-target master bank information A12.

In step S110 the master microcomputer 2 sets the master operation information A11 to "idle", and the process proceeds to step S111.

As step S107 to step S109 indicate, the master microcomputer 2 sets, as the next updating-target master bank, a master bank different from the master bank that stores the master data having been transmitted in step S104. In a case where, for instance, the master data transmitted in step S104 is stored in the master bank A2, the master bank A3 is set as the next updating-target master bank.

In step S111, the master microcomputer 2 transmits to the slave microcomputer 3 the master information in the master information area A1, and terminates the series of processes. In this case, the slave microcomputer 3 receives the master information in the master information area A1, and reflects that master information on the master information area B1.

As indicated by step S104 to step S106 and step S111, the master microcomputer 2 transmits the master data in the updating-target master bank to the slave microcomputer 3, and thereafter increments the master bank updating counter value A13 in the master information area A1, and further transmits the master information in the master information area A1 to the slave microcomputer 3.

As indicated by step S104, step S105 and step S107 to step S109, the master microcomputer 2 transmits the master data in the updating-target master bank to the slave microcomputer 3, and thereafter performs a master bank switching process of switching the setting of the updating-target master bank.

Explanation of a Master Data Reflection Process

Next, a series of processes for reflection of the master data on the slave RAM 33 by the slave microcomputer 3 will be explained with reference to FIG. 4. FIG. 4 is a flowchart illustrating a reflection process of master data by the slave microcomputer 3 of Embodiment 1 of the present invention. The process of the flowchart of FIG. 4 is for instance executed repeatedly according to a pre-set timing.

In step S201, the slave microcomputer 3 checks the master bank updating counter value B13 in the master information area B1, and the process proceeds to step S202.

In step S202, the slave microcomputer 3 checks the updating-target master bank information B12 of the master information area B1, and the process proceeds to step S203.

If in step S203 the updating-target master bank information B12 checked in step S202 denotes the master bank A2, the process in the slave microcomputer 3 proceeds to step S204; if on the other hand in step S203 the updating-target master bank information B12 checked in step S202 denotes the master bank A3, the process in the slave microcomputer 3 proceeds to step S205.

In step S204 the slave microcomputer 3 sets to "master bank B3" the reflection-target master bank being the target for reflection on the target data area B7, and the process proceeds to step S206.

In step S205 the slave microcomputer 3 sets the reflection-target master bank to "master bank B2", and the process proceeds to step S206.

As step S202 to step S205 indicate, the slave microcomputer 3 sets the reflection-target master bank in accordance with the updating-target master bank information B12.

For instance, if the updating-target master bank information B12 denotes the master bank A2, there is a possibility that the master bank A2 is being updated in the master microcomputer 2. Accordingly, the master data stored in the master bank B3 corresponding to the master bank A3 is to be reflected on the target data area B7. In a case where the updating-target master bank information B12 denotes the master bank A2, therefore, the slave microcomputer 3 sets the reflection-target master bank to "master bank B3".

In step S206, the slave microcomputer 3 reflects on the target data area B7 the master data stored in the reflection-target master bank, and the process proceeds to step S207. Through reflection of the master bank of the reflection-target master bank on the target data area B7, the slave microcomputer 3 updates the existing target data in the target data area B7 to the master data in the reflection-target master bank.

As step S202 to step S206 indicate, the slave microcomputer 3 sets, as the reflection-target master bank, a master bank different from that of the updating-target master bank information B12 in the master information area B1, and updates the existing target data in the target data area B7 to the master data in the set reflection-target master bank.

In step S207, the slave microcomputer 3 checks again the master bank updating counter value B13 in the master information area B1, and the process proceeds to step S208.

In step S208, the slave microcomputer 3 determines whether the master bank updating counter value B13 has changed or not during reflection of the master data on the target data area B7. Specifically, the slave microcomputer 3 compares the master bank updating counter value B13 checked in step S201 and the master bank updating counter value B13 checked in step S207.

If the comparison results reveal that both values are identical, the slave microcomputer 3 determines that the master bank updating counter value B13 has not changed, and the process is terminated. If on the other hand the comparison results reveal that the values are dissimilar, the slave microcomputer 3 determines that the master bank updating counter value B13 has changed, and the process returns to step S201 for executing again the series of processes.

That is, if the master bank updating counter value B13 changes during reflection, on the target data area B7, of the master data in the reflection-target master bank, then latest master data is stored in a master bank that is different from the reflection-target master bank. In such a case, therefore, the slave microcomputer 3 executes again the series of processes in order to reflect the latest master data on the target data area B7.

As step S201 to step S208 indicate, if the master bank updating counter value B13 in the master information area B1 differs before and after updating of the existing target data in the target data area B7, then the slave microcomputer 3 sets again the reflection-target master bank and updates again the existing target data in the target data area B7.

Explanation of Second Data Communication Between the Master Microcomputer 2 and the Slave Microcomputer 3

Figure 5:
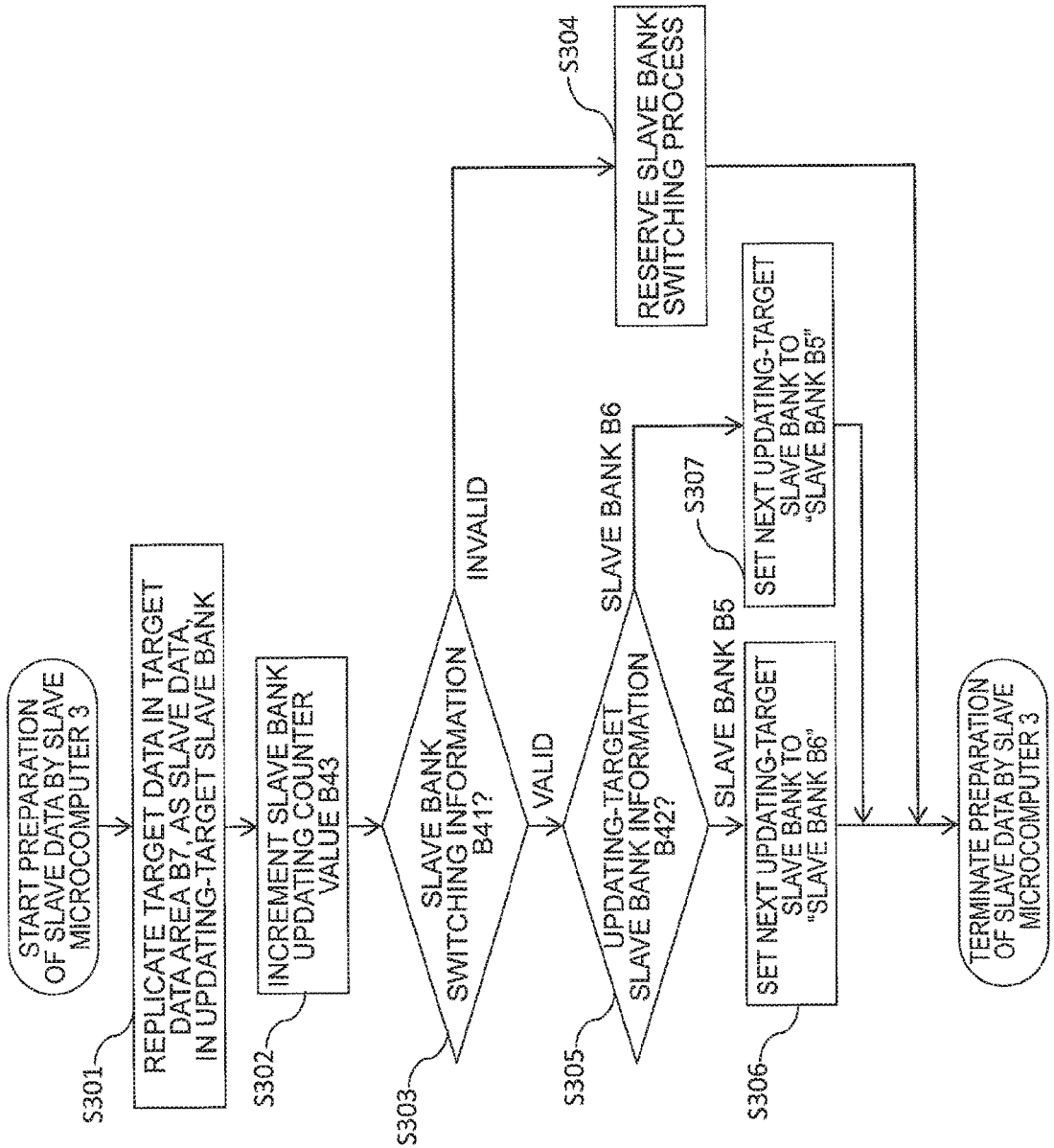
FIG. 5 is a flowchart illustrating a preparation process of slave data by the slave microcomputer of Embodiment 1 of the present invention.
Figure 6:
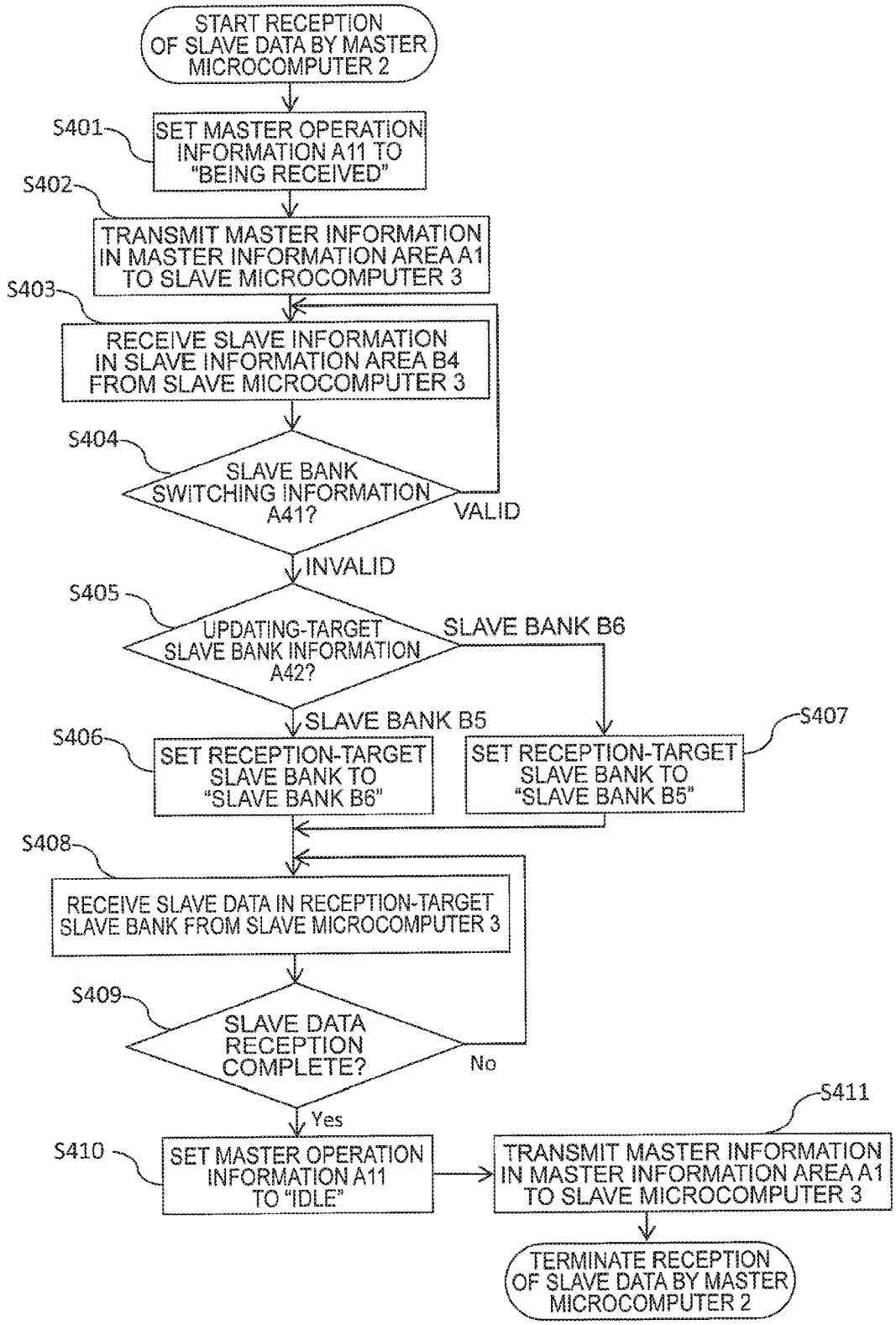
FIG. 6 is a flowchart illustrating a reception process of slave data by the master microcomputer of Embodiment 1 of the present invention.

An explanation follows next, with reference to FIG. 5 and FIG. 6, on a series of processes for preparation of the slave data by the slave microcomputer 3, and a series of processes for reception of slave data by the master microcomputer 2.

Explanation of a Slave Data Preparation Process

A series of processes for preparation of the slave data by the slave microcomputer 3 will be explained next with reference to FIG. 5. FIG. 5 is a flowchart illustrating a preparation process of slave data by the slave microcomputer 3 of Embodiment 1 of the present invention. The process of the flowchart of FIG. 5 is for instance executed repeatedly according to a pre-set timing.

In step S301 the slave microcomputer 3 replicates the target data in the target data area B7, as slave data, in the currently set updating-target slave bank i.e. the slave bank denoted by the updating-target slave bank information B42, and the process proceeds to step S302. Through replication of the slave data in the updating-target slave bank, the slave microcomputer 3 updates the existing slave data in the updating-target slave bank to new slave data that is transmitted to the master microcomputer 2.

In step S302 the slave microcomputer 3 increments the slave bank updating counter value B43 by 1, and the process proceeds to step S303.

In step S303, the slave microcomputer 3 checks the slave bank switching information B41; if the slave bank switching information B41 is invalid, the process proceeds to step S304, whereas if the slave bank switching information B41 is valid, the process proceeds to step S305.

In step S304, the slave microcomputer 3 reserves a slave bank switching process and terminates the process, since the setting of the updating-target slave bank cannot be switched immediately.

In step S305, the slave microcomputer 3 checks the currently set updating-target slave bank i.e. the slave bank denoted by the updating-target slave bank information B42, in order to switch the updating-target slave bank. If the check result is that the updating-target slave bank is the slave bank B5, the process in the slave microcomputer 3 proceeds to step S306, whereas if the updating-target slave bank is the slave bank B6, the process proceeds to step S307.

In step S306 the slave microcomputer 3 sets a next updating-target slave bank to "slave bank B6", and the process is terminated. In this case, the slave microcomputer 3 stores the set slave bank B6 as the updating-target slave bank information B42, in the slave information area B4.

In step S307 the slave microcomputer 3 sets the next updating-target slave bank to "slave bank B5", and the process is terminated. In this case, the slave microcomputer 3 stores the set slave bank B5, as the updating-target slave bank information B42, in the slave information area B4.

As step S305 to step S307 indicate, the slave microcomputer 3 sets, as a next updating-target slave bank, a slave bank different from the slave bank for which slave data has been replicated in step S301. In a case where for instance the slave bank B6 is set as the next updating-target slave bank, the slave bank for which slave data has been replicated in step S301 is the slave bank B5.

As indicated by step S301, step S303 and step S305 to step S307, the slave microcomputer 3 performs the slave bank switching process if the slave bank switching information B41 in the slave information area B4 denotes "valid" after updating of the existing slave data in the updating-target slave bank.

As indicated by step S301, step S303 and step S304, the slave microcomputer 3 reserves the slave bank switching process if the slave bank switching information B41 in the slave information area B4 denotes "invalid" after updating of the existing slave data in the updating-target slave bank.

Explanation of a Slave Data Reception Process

A series of processes for reception of the slave data by master microcomputer 2 will be explained next with reference to FIG. 6. FIG. 6 is a flowchart illustrating a reception process of slave data by the master microcomputer 2 of Embodiment 1 of the present invention. The process of the flowchart of FIG. 6 is for instance executed repeatedly according to a pre-set timing.

In step S401, the master microcomputer 2 sets the master operation information A11 in the master information area A1 to "being received", and the process proceeds to step S402.

In step S402, the master microcomputer 2 issues a reception request to the slave microcomputer 3, transmits master information in the master information area A1 to the slave microcomputer 3, and the process proceeds to step S402. In this case, the slave microcomputer 3 receives the master information in the master information area A1, and reflects that master information on the master information area B1.

In step S403, the master microcomputer 2 issues a transmission request to the slave microcomputer 3, and, as a result, receives from the slave microcomputer 3 slave information in the slave information area B4, and the process proceeds to step S404. In this case, the master microcomputer 2 reflects the received slave information in the slave information area B4 on the slave information area A4.

In step S404, the master microcomputer 2 checks the slave bank switching information A41 of the slave information area A4; if the slave bank switching information A41 denotes non-validity, the process proceeds to step S405, whereas if the slave bank switching information B41 denotes validity, the process returns to step S403.

In step S405 the master microcomputer 2 checks the updating-target slave bank information A42 in the slave information area A4; if the updating-target slave bank information A42 denotes the slave bank B5, the process proceeds to step S406, whereas if the updating-target slave bank information A42 denotes the slave bank B6, the process proceeds to step S407.

In step S406, the master microcomputer 2 sets to "slave bank B6" the reception-target slave bank that stores the slave data being a target for reception from the slave microcomputer 3, and the process proceeds to step S408.

In step S407, the master microcomputer 2 sets the reception-target slave bank to "slave bank B5", and the process proceeds to step S408.

As step S405 to step S407 indicate, the master microcomputer 2 sets the reception-target slave bank in accordance with the updating-target slave bank information A42.

In a case where, for instance, the updating-target slave bank information A42 denotes the slave bank B5, there is a possibility that the slave bank B5 is being updated in the slave microcomputer 3. Accordingly, the slave data stored in the slave bank B6 not being updated is to be received herein. The slave microcomputer 3 sets therefore the reception-target slave bank to "slave bank B6" in a case where the updating-target slave bank information A42 denotes the slave bank B5.

In step S408, the master microcomputer 2 issues a transmission request to the slave microcomputer 3, and receives as a result, from the slave microcomputer 3, the slave data in the reception-target slave bank; the process proceeds then to step S409.

In step S409 the master microcomputer 2 determines whether reception of the slave data is complete or not. If reception of slave data by the master microcomputer 2 is complete, the process proceeds to step S410, whereas if slave data reception is not complete, the process returns to step S408. Thus, the master microcomputer 2 goes on receiving slave data until all the slave data has been received.

In step S410, the master microcomputer 2 sets the master operation information A11 in the master information area A1 to "idle", and the process proceeds to step S411.

In step S411, the master microcomputer 2 transmits to the slave microcomputer 3 the master information in the master information area A1, and the process is terminated. In this case, the slave microcomputer 3 receives the master information in the master information area A1, and reflects that master information on the master information area B1.

As step S403, step S405 to step S407 and step S408 indicate, the master microcomputer 2 receives the slave information in the slave information area B4, sets, as a reception-target slave bank, a slave bank different from that of the updating-target slave bank information A42 in the slave information area A4, and receives the slave data in the set reception-target slave bank.

As step S401 to step S403 and step S409 to step S411 indicate, before receiving the slave information in the slave information area B4, the master microcomputer 2 sets the master operation information A11 in the master information area A1 to "being received", and transmits the master information in the master information area A1; after reception of the slave data in the reception-target slave bank is complete, the master microcomputer 2 sets the master operation information A11 in the master information area A1 to "idle", and transmits the master information in the master information area A1.

As step S403, step S404 and step S408 indicate, while the slave bank switching information A41 in the slave information area A4 denotes "valid", the master microcomputer 2 repeats reception of slave information in the slave information area B4, and if the slave bank switching information A41 becomes "invalid", the master microcomputer 2 receives slave data in the reception-target slave bank.

Explanation of a Process upon Master Information Reception

Figure 7:
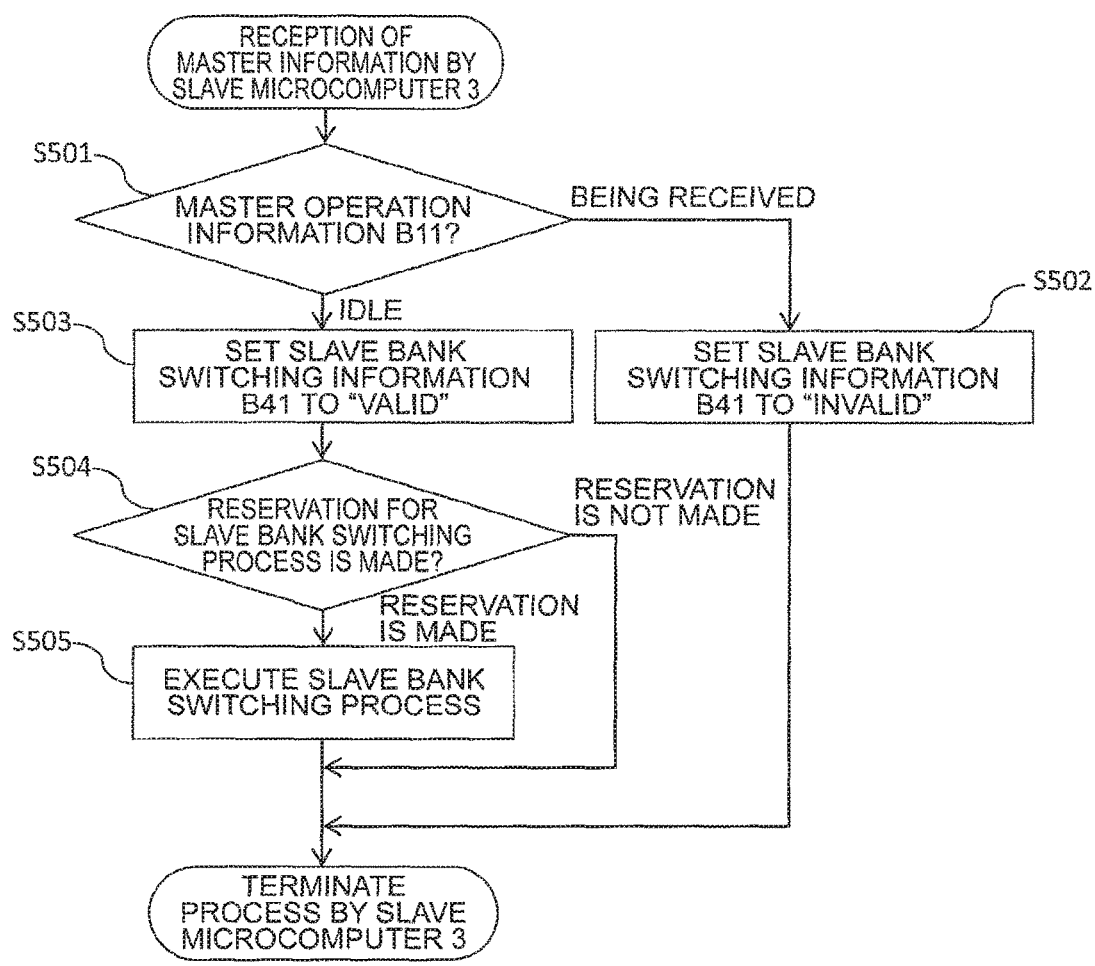
FIG. 7 is a flowchart illustrating a process upon reception of master data by the slave microcomputer of Embodiment 1 of the present invention.

An explanation follows next, with reference to FIG. 7, on a series of processes after reception of master information in the master information area A1 by the slave microcomputer 3, and reflection of that master information on the master information area B1, in a case where step S402 or step S411 of FIG. 6 has been executed. FIG. 7 is a flowchart illustrating a process upon reception of master information by the slave microcomputer 3 of Embodiment 1 of the present invention. The process of the flowchart of FIG. 7 is performed if step S402 or step S411 of FIG. 6 has been executed and the slave microcomputer 3 receives master information from the master microcomputer 2.

In step S501, the slave microcomputer 3 checks the master operation information B11 in the master information area B1; if the master operation information B11 denotes reception in progress, the process proceeds to step S502, whereas if the master operation information B11 denotes idle, the process proceeds to step S503.

In step S502, while slave data in the reception-target slave bank is being transmitted to the master microcomputer 2 in response to the transmission request from the master microcomputer 2, the slave microcomputer 3 sets the slave bank switching information B41 to "invalid", and terminates the process, in order to suppress execution of the slave bank switching process.

In step S503, the slave microcomputer 3 sets the slave bank switching information B41 to "valid", and the process proceeds to step S504.

In step S504, the slave microcomputer 3 checks the presence or absence of reservation of a slave bank switching process; if the reservation is made, the process proceeds to step S505, whereas if the reservation is not made, the process is terminated.

In step S505, since the reservation is made, the slave microcomputer 3 performs the slave bank switching process, and terminates the process.

As step S501 to step S503 indicate, if upon reception of the master information in the master information area A1 having been transmitted in the slave data reception process the master operation information B11 in the master information area B1 denotes "idle", the slave microcomputer 3 sets the slave bank switching information B41 in the slave information area B4 to "valid", while if the master operation information B11 denotes "being received", the slave microcomputer 3 sets the slave bank switching information B41 to "invalid".

As step S504 and step S505 indicate, the slave microcomputer 3 executes the slave bank switching process if the reservation for the slave bank switching process is made when the slave microcomputer 3 sets the slave bank switching information B41 in the slave information area B4 to "valid".

Explanation of Abnormality Detection in the Master Microcomputer 2 and the Slave Microcomputer 3

Figure 8:
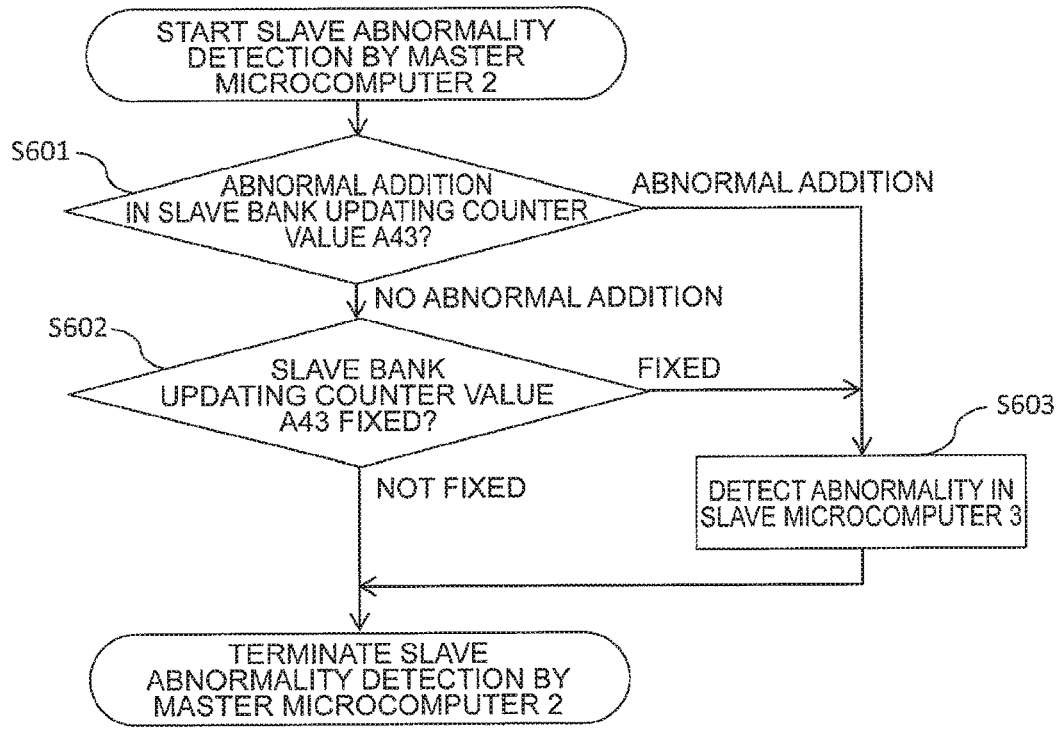
FIG. 8 is a flowchart illustrating a process of detection of an abnormality in the slave microcomputer by the master microcomputer of Embodiment 1 of the present invention.
Figure 9:
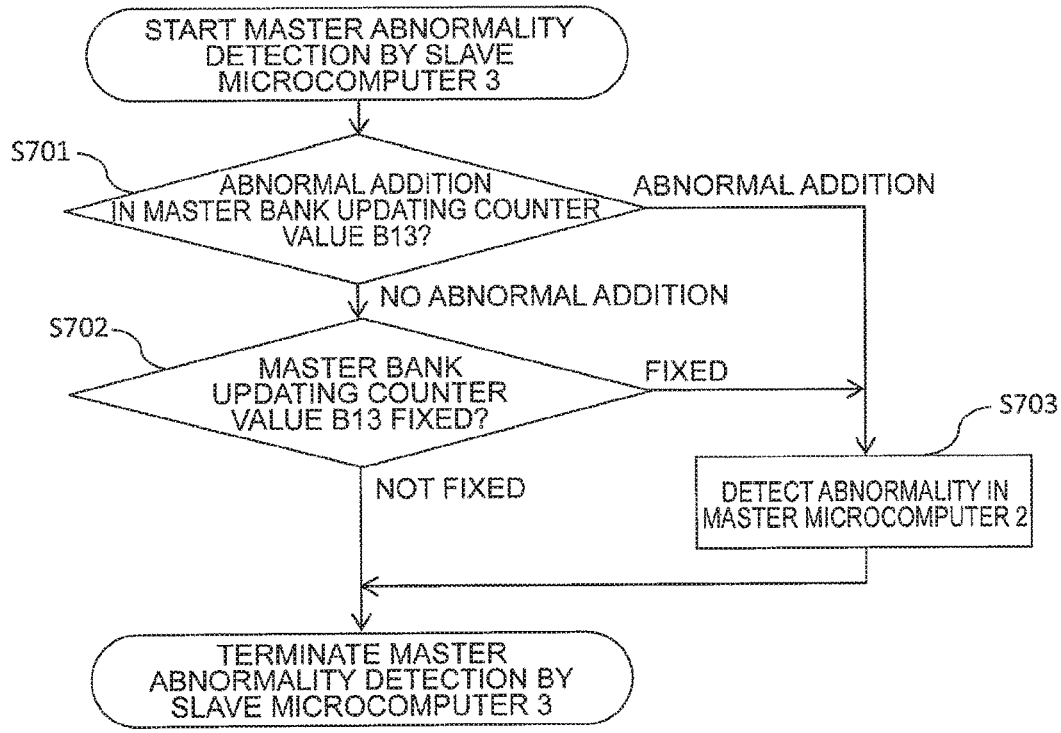
FIG. 9 is a flowchart illustrating a process of detection of an abnormality in the master microcomputer by the slave microcomputer of Embodiment 1 of the present invention.

An explanation follows next, with reference to FIG. 8 and FIG. 9, on a series of processes for detection of an abnormality in the slave microcomputer 3 by the master microcomputer 2, and on a series of processes for detection of an abnormality in the master microcomputer 2 by the slave microcomputer 3.

Explanation of a Slave Abnormality Detection Process

A series of processes for detection of an abnormality in the slave microcomputer 3 by the master microcomputer 2 will be explained next with reference to FIG. 8. FIG. 8 is a flowchart illustrating a process of detection of an abnormality in the slave microcomputer 3 by the master microcomputer 2, in Embodiment 1 of the present invention. The process of the flowchart of FIG. 8 is for instance executed repeatedly according to a pre-set timing.

In step S601, the master microcomputer 2 checks the presence or absence of abnormal addition in the slave bank updating counter value A43 in the slave information area A4. Abnormal addition in an updating counter value denotes an abnormality whereby the change in an updating counter value within a certain period of time is larger than a design value. Given for instance a design of a +1 change in an updating counter value within a certain period of time, then a +3 change in that updating counter value is determined as an abnormal addition in the updating counter value.

If in step S601 the master microcomputer 2 determines that there is abnormal addition in the slave bank updating counter value A43, the process proceeds to step S603, whereas if the master microcomputer 2 determines that there is no abnormal addition in the slave bank updating counter value A43, the process proceeds to step S602.

In step S602, the master microcomputer 2 checks whether the slave bank updating counter value A43 in the slave information area A4 is fixed or not. Fixing of the updating counter value denotes herein an abnormality whereby the updating counter value exhibits no change within a certain period of time. For instance, an updating counter value is determined to be fixed if the updating counter value remains the same value within a certain period of time.

If in step S602 the master microcomputer 2 determines that the slave bank updating counter value A43 is fixed, the process proceeds to step S603, whereas if the master microcomputer 2 determines that the slave bank updating counter value A43 is not fixed, the process is terminated.

In step S603, the master microcomputer 2 detects an abnormality in the slave microcomputer 3, and the process is terminated.

The master microcomputer 2 detects thus an abnormality in the slave microcomputer 3 by monitoring the slave bank updating counter value A43 in the slave information area A4.

Explanation of a Master Abnormality Detection Process

The series of processes for detection of an abnormality in the master microcomputer 2 by the slave microcomputer 3 will be explained next with reference to FIG. 9. FIG. 9 is a flowchart illustrating a process of detection of an abnormality in the master microcomputer 2 by the slave microcomputer 3 in Embodiment 1 of the present invention. The process of the flowchart of FIG. 9 is for instance executed repeatedly according to a pre-set timing.

In step S701, the slave microcomputer 3 checks the presence or absence of abnormal addition in the master bank updating counter value B13 in the master information area B1. If the slave microcomputer 3 determines that there is abnormal addition in the master bank updating counter value B13, the process proceeds to step S703, whereas if the slave microcomputer 3 determines that there is no abnormal addition in the master bank updating counter value B13, the process proceeds to step S702.

In step 702, the slave microcomputer 3 checks whether the master bank updating counter value B13 in the master information area B1 is fixed or not. If the slave microcomputer 3 determines that the master bank updating counter value B13 is fixed, the process proceeds to step S703, whereas if the slave microcomputer 3 determines that the master bank updating counter value B13 is not fixed, the process is terminated.

In step S703, the slave microcomputer 3 detects an abnormality in the master microcomputer 2, and the process is terminated.

Thus, the slave microcomputer 3 detects an abnormality of the master microcomputer 2 by monitoring the master bank updating counter value B13 in the master information area B1.

In the present Embodiment 1, thus, the electronic control unit is configured by being provided with the master microcomputer that executes the master data transmission process and the slave data reception process, and with the slave microcomputer that executes the master data reflection process and the slave data preparation process.

As the master data transmission process, the master microcomputer is configured to, update, to new master data to be transmitted, existing master data in an updating-target master bank, transmit the master information in the transmission master information area, and thereafter transmit the master data in the updating-target master bank. As the master data reflection process, the slave microcomputer is configured to set, as a reflection-target master bank, a reception master bank different from that of the updating-target master bank information in the reception master information area, and to update existing target data in the slave target data area to the master data in the reflection-target master bank that has been set.

As the slave data preparation process, the slave microcomputer is configured to update, to new slave data to be transmitted, existing slave data in the updating-target slave bank. As the slave data reception process, the master microcomputer is configured to receive the slave information in the transmission slave information area, to set, as a reception-target slave bank, a transmission slave bank different from that of the updating-target slave bank information in the reception slave information area, and to receive the slave data in the set reception-target slave bank.

By configuring the master microcomputer and the slave microcomputer in the above manner it becomes possible to use new data, without mixing of old and new data, even when the slave microcomputer receives a transmission/reception request of target data from the master microcomputer.

In Embodiment 1 instances have been illustrated in which the present invention is used for data communication between a master microcomputer functioning as a master and a slave microcomputer functioning as a slave, but the present invention is not limited thereto, and can be used also for data communication among a plurality of electronic control units. In Embodiment 1 instances have been illustrated in which a master bank and a slave bank are each divided into two areas, but the invention is not limited thereto, and the banks may each be divided into three or more areas.

What is claimed is:

1. An electronic control unit, comprising:
a main data transmitter-receiver having a master memory; and
a subordinate data transmitter-receiver having a slave memory,
the main data transmitter-receiver and the subordinate data transmitter-receiver being connected so as to be capable of communicating with each other,
wherein the master memory has:
a master target data area that stores target data;
a plurality of transmission master banks that store, as master data, the target data in the master target data area;
a transmission master information area that stores master information including updating-target master bank information denoting a transmission master bank that is set as an updating-target master bank, from among the plurality of transmission master banks;
a reception slave information area that stores slave information received from the subordinate data transmitter-receiver; and
a plurality of reception slave banks that store slave data received from the subordinate data transmitter-receiver, in accordance with the slave information in the reception slave information area,
the slave memory has:
a slave target data area that stores the target data;
a plurality of transmission slave banks that store, as the slave data, the target data in the slave target data area;
a transmission slave information area that stores the slave information including updating-target slave bank information denoting a transmission slave bank that is set as an updating-target slave bank, from among the plurality of transmission slave banks;
a reception master information area that stores the master information received from the main data transmitter-receiver; and
a plurality of reception master banks that store the master data received from the main data transmitter-receiver, in accordance with the master information in the reception master information area,
as a master data transmission process, the main data transmitter-receiver updates, to new master data to be transmitted, existing master data in the updating-target master bank that has been set, transmits the master information in the transmission master information area, and thereafter transmits the master data in the updating-target master bank,
as a master data reflection process, the subordinate data transmitter-receiver sets, as a reflection-target master bank, one of the reception master banks that is different from that of the updating-target master bank information in the reception master information area, and updates existing target data in the slave target data area to the master data in the reflection-target master bank that has been set,
as a slave data preparation process, the subordinate data transmitter-receiver updates, to new slave data to be transmitted, existing slave data in the updating-target slave bank that has been set, and
as a slave data reception process, the main data transmitter-receiver receives the slave information in the transmission slave information area, sets, as a reception-target slave bank, one of the transmission slave banks that is different from that of the updating-target slave bank information in the reception slave information area, and receives the slave data in the reception-target slave bank that has been set.

2. The electronic control unit of claim 1,
wherein the master information further includes a master bank updating counter value denoting the number of times that the existing master data in the updating-target master bank has been updated,
in the master data transmission process, the main data transmitter-receiver transmits the master data in the updating-target master bank, and thereafter increments the master bank updating counter value of the transmission master information area, and further transmits the master information, and
in the master data reflection process, when the master bank updating counter value of the reception master information area differs before and after updating of the existing target data in the slave target data area, the subordinate data transmitter-receiver sets again the reflection-target master bank and updates again the existing target data in the slave target data area.

3. The electronic control unit of claim 1,
wherein, in the master data transmission process, the main data transmitter-receiver transmits the master data in the updating-target master bank, and thereafter performs a master bank switching process of switching a setting of the updating-target master bank.

4. The electronic control unit of claim 1,
wherein the master information further includes master operation information denoting an operation state of the main data transmitter-receiver, the slave information further includes slave bank switching information denoting whether or not to permit a slave bank switching process of switching a setting of the updating-target slave bank, in the slave data reception process, before reception of the slave information in the transmission slave information area, the main data transmitter-receiver sets the master operation information in the transmission master information area to "being received" and transmits the master information in the transmission master information area, and after reception of the slave data in the reception-target slave bank is complete, sets the master operation information in the transmission master information area to "idle" and transmits the master information in the transmission master information area, as a process upon master information reception, the subordinate data transmitter-receiver receives the master information in the transmission master information area having been transmitted in the slave data reception process, and when the master operation information in the reception master information area denotes "idle", sets the slave bank switching information in the transmission slave information area to "valid", and when the master operation information denotes "being received", sets the slave bank switching information to "invalid", in the slave data preparation process, the subordinate data transmitter-receiver performs the slave bank switching process when the slave bank switching information in the transmission slave information area denotes "valid" after updating of the existing slave data in the updating-target slave bank, and in the slave data reception process, the main data transmitter-receiver repeats reception of the slave information in the transmission slave information area while the slave bank switching information in the reception slave information area denotes "valid", and when the slave bank switching information becomes "invalid", receives the slave data in the reception-target slave bank.

5. The electronic control unit of claim 4, wherein, in the slave data preparation process, the subordinate data transmitter-receiver reserves the slave bank switching process when the slave bank switching information in the transmission slave information area denotes "invalid" after updating of the existing slave data in the updating-target slave bank, and in the process upon master information reception, the subordinate data transmitter-receiver performs the slave bank switching process in a case where the reservation is made when the slave bank switching information in the transmission slave information area is set to "valid".

6. The electronic control unit of claim 1, wherein the slave information further includes a slave bank updating counter value denoting the number of times that the existing slave data in the updating-target slave bank has been updated, and as a slave abnormality detection process, the main data transmitter-receiver detects an abnormality in the subordinate data transmitter-receiver by monitoring the slave bank updating counter value of the reception slave information area.

7. The electronic control unit of claim 1, wherein the master information further includes a master bank updating counter value denoting the number of times that the existing master data in the updating-target master bank has been updated, and as a master abnormality detection process, the subordinate data transmitter-receiver detects an abnormality in the main data transmitter-receiver by monitoring the master bank updating counter value of the reception master information area.

* * * * *